United States Patent [19]

Fukui et al.

[11] 4,235,205

[45] Nov. 25, 1980

[54] FUEL FEED DEVICE FOR ENGINE

[75] Inventors: Toyoaki Fukui, Katsuragoshomachi; Tatsuro Nakagami, Kyoto; Norio Endo, Kameoka; Takao Miki, Himeji; Takashi Ishida, Oimachi, all of Japan

[73] Assignees: Mitsubishi Jidosha Kogyo Kabushiki Kaisha; Mitsubishi Denki Kabushiki Kaisha; Mikuni Kogyo Kabushiki Kaisha, all of Tokyo, Japan

[21] Appl. No.: 56,515

[22] Filed: Jul. 11, 1979

[30] Foreign Application Priority Data

Jul. 13, 1978 [JP] Japan ................................. 53-85358

[51] Int. Cl.³ ......................... F02B 3/00; F02M 13/06
[52] U.S. Cl. .................................. 123/472; 123/463; 123/478; 123/487; 123/32 F
[58] Field of Search ............. 123/32 EA, 32 AE, 127, 123/32 F, 139 AW, 32 EF

[56] References Cited

U.S. PATENT DOCUMENTS

| | | | |
|---|---|---|---|
| 3,036,564 | 5/1962 | Guiot | 123/32 EA |
| 3,677,236 | 7/1972 | Moss | 123/32 AE |
| 3,960,118 | 6/1976 | Konomi | 123/127 |
| 4,132,204 | 1/1979 | Teague | 123/127 |
| 4,140,088 | 2/1979 | Vulpillieres | 123/32 EA |

Primary Examiner—Ronald B. Cox
Attorney, Agent, or Firm—Robert E. Burns; Emmanuel J. Lobato; Bruce L. Adams

[57] ABSTRACT

A fuel feed device for an engine capable of electronically controlling the fuel feed rate corresponding to the suction air flow rate in the intake passage, comprising an air flow rate detecting device for generating electric signals of frequencies proportional to suction air rate, a plurality of electromagnetic valves disposed at a suitable position in the intake passage and adapted so as to permit supplying through a fuel pressure regulator the fuel of a fixed pressure differential with the suction pressure near a fuel outlet, and an electric control means for driving the electromagnetic valves with a shifted phase with one another to control the respective opening times thereof in accordance with the engine operating condition. Thus the accurate and highly reliable fuel supply is achieved over the wide range of engine operating condition from the idling to the maximum speed operation.

10 Claims, 6 Drawing Figures

FUEL FEED DEVICE FOR ENGINE

DETAILED DESCRIPTION OF THE INVENTION

This invention relates to a fuel feed device having electromagnetic valves capable of injecting fuel into the fuel suction pipe, more particularly, to a fuel feed device for an engine capable of electronically controlling the fuel feed rate in proportion to the quantity of the suction air.

Conventionally, there has been provided a fuel feed device for an engine constituted to electronically control the fuel feed rate by controlling a single electromagnetic valve by pulse signals generated according to electric signals corresponding to the quantity of the suction air.

In general, when an engine is operating at the maximum speed with the throttle fully opened, the suction air rate is 30 to 40 times the air rate at idling, requiring 30 to 40 times the fuel feed rate at idling.

Accordingly, in the conventional fuel feed device with a single electromagnetic valve, the pulse width of the pulse signals has to be extremely reduced to smoothly operate the electromagnetic valve over the wide range corresponding to the engine operating conditions from the idling to the maximum speed operation. When the pulse width is reduced, a larger sized expensive electromagnetic valve is indispensable to raise the responsiveness of the electromagnetic valve.

An object of the present invention is to provide a fuel feed device for an engine capable of feeding fuel for the engines over the wide operating range from the idling speed to the maximum speed of the engines, without requiring an electromagnetic valve of higher grade, by controlling the opening timing of a plurality of electromagnetic valves disposed at a junction of suction pipes to vary for a fixed phase with one another.

A fuel feed device for an engine according to the present invention is characterized in the provision of an air rate detecting device which outputs electric signals having frequencies corresponding to the suction air rate, a plurality of electromagnetic valves disposed at the juntion of the suction pipes to control the fuel feed rate into the suction pipes, a fuel pressure regulator for maintaining at constant the pressure differential pressure regulator for maintaining at constant the pressure differential between the fuel feed pressure to the electromagnetic valves and the suction pressure near the fuel outlet, and an electric control means for controlling the electromagnetic valves to vary the operating phase of the electromagnetic valves with one another so that the electromagnetic valves operate following-up or synchronizing with the frequency or the demultiplied frequency of the electric signals given by the air rate detecting device.

Explanation will be made on a preferred fuel feed device for an engine embodied according to the present invention referring to the attached drawings.

Figure 1:
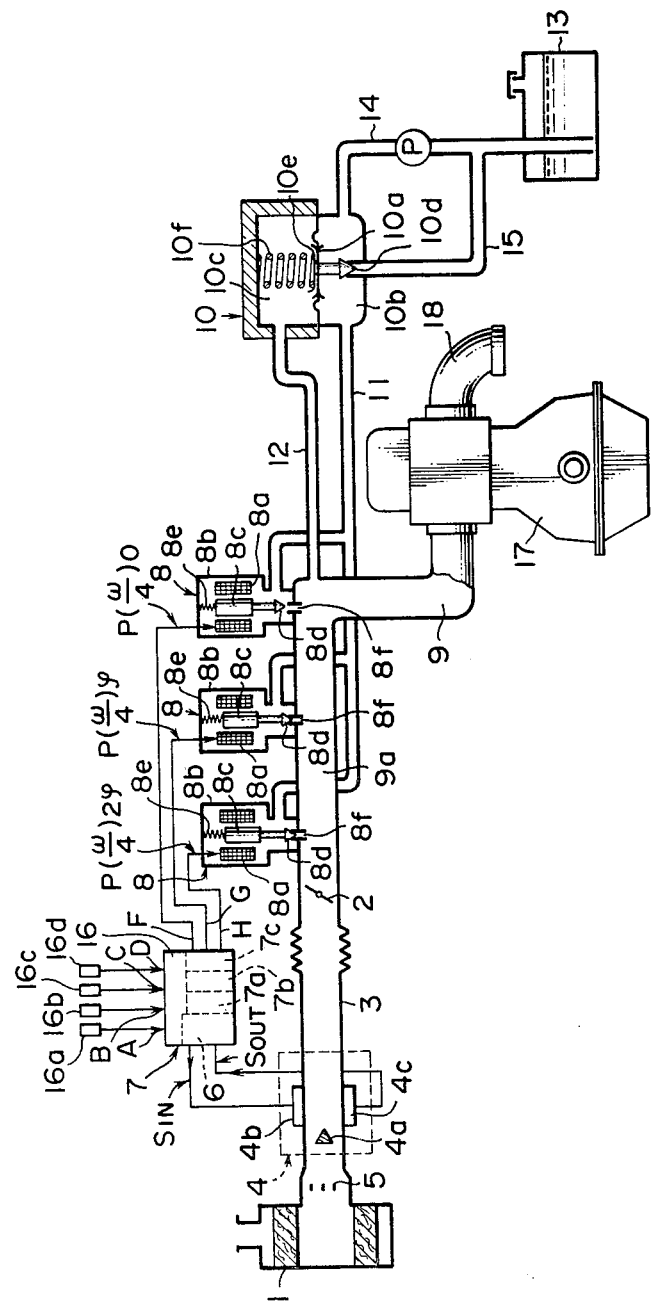
Figure 2:
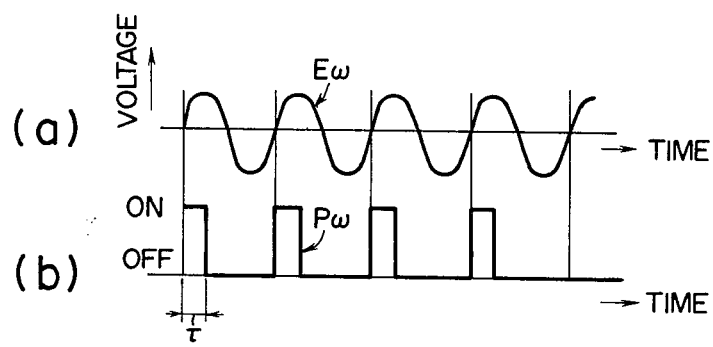
Figure 3:
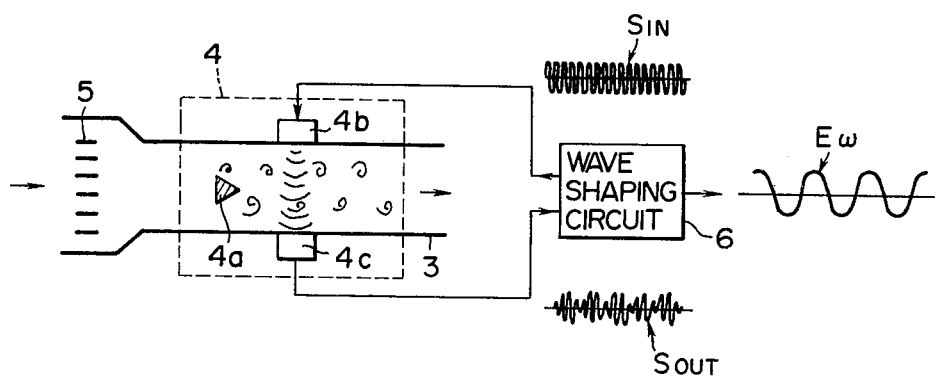
Figure 4:
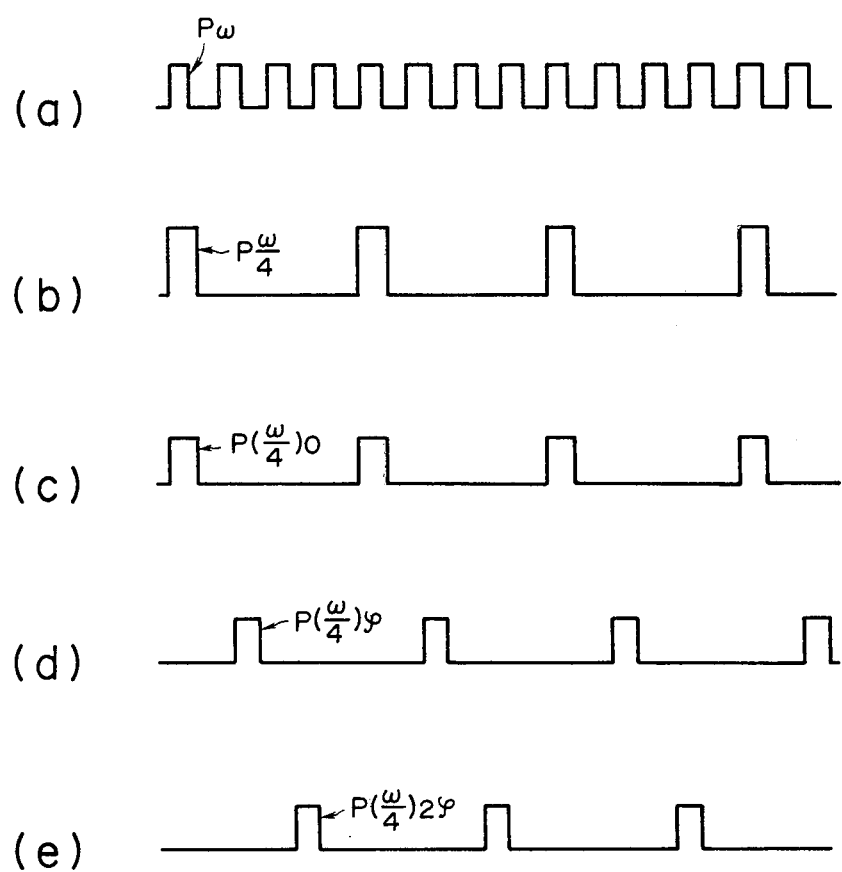
Figure 5:
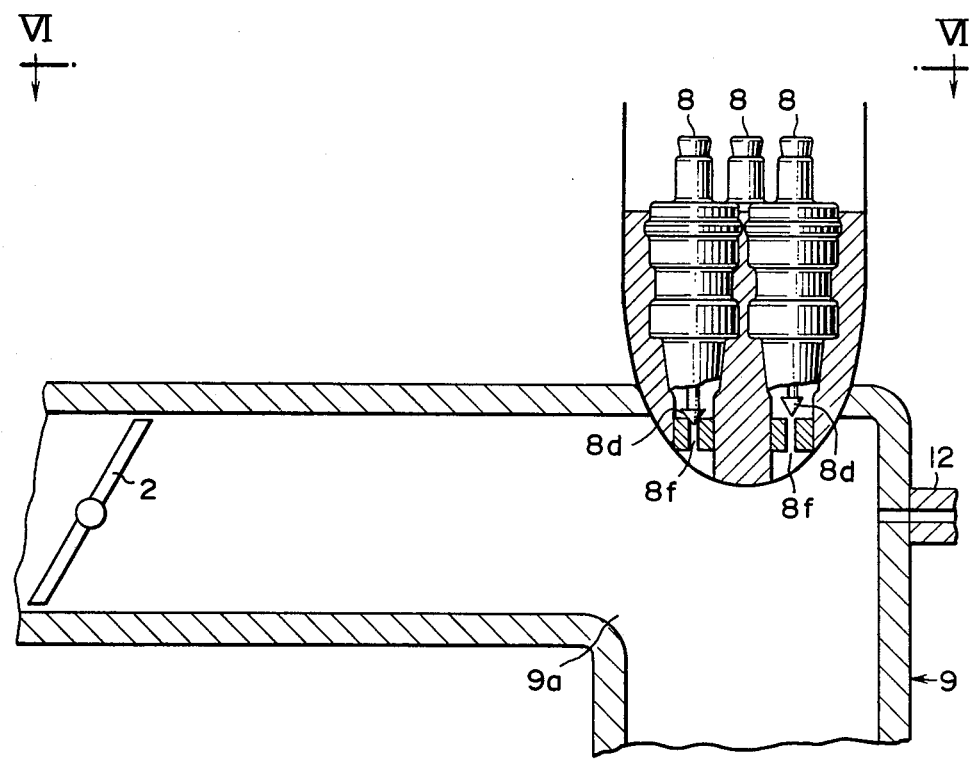
Figure 6:
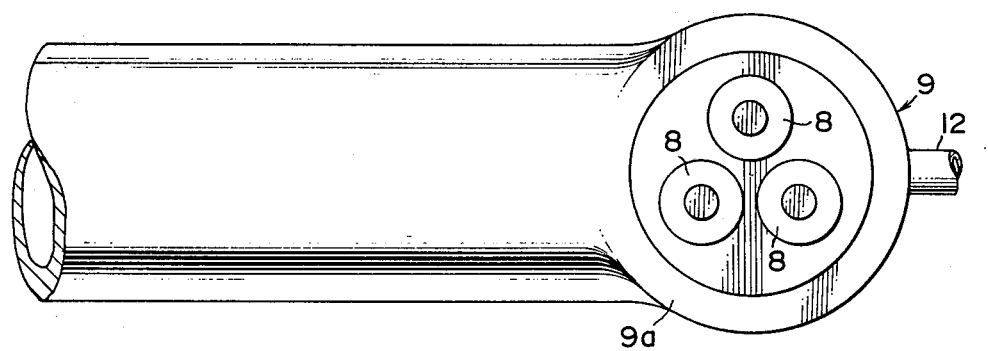

FIG. 1 is a schematic representation of the fuel feed device,

FIG. 2-a is a graphical representation of a wave form of an output of an air rate detecting device of the fuel feed device, FIG. 2-b is a graphical representation of a driving pulse raw applied to the electromagnetic valves by the electric control means, FIG. 3 is a schematic illustration for explaining the function of the air rate detecting device, FIGS. 4-a to 4-e inclusive are graphical representations for explaining the control of the electromagnetic valve operation, FIG. 5 is an enlarged partial longitudinal sectional view of disposition of the electromagnetic valves and FIG. 6 is a plan view of FIG. 5 seen in the direction VI—VI.

Referring to FIGS. 1 and 3, an air rate detecting device 4 is provided on a suction pipe 3 between an air cleaner 1 and a throttle valve 2.

The air rate detecting device 4 is constituted of a triangular prism 4a disposed perpendicularly against the suction air flowing direction, a speaker 4b functioning as an ultrasonic wave generator and a microphone 4c functioning as an ultrasonic wave receiver both disposed at the down stream of the triangular prism 4a on the outer wall of the suction pipe 3 oppositely to each other. Reference numeral 5 designates a suction air flow rectifier provided for rectifying the suction air flow thus assuring stabilized operation of the suction air rate detecting device 4.

As the suction air rectified by the rectifier 5 streams within the suction pipe 3, nonsymmetric turbulance (Kerman trail) is produced in the down stream of the prism 4a as illustrated in FIG. 3. It is known that the frequency produced by the turbulance is proportional to the velocity of the air flowing through the suction pipe 3 under a fixed condition, therefore, the velocity of the air (or the volume flow rate) is detected by measuring the frequency produced by the turbulance.

Accordingly, the ultrasonic wave $S_{IN}$ generated by the speaker 4b, under a condition that the turbulance of a frequency proportional to the velocity of the air flow is produced in the down stream of the prism 4a, is subjected to amplitude modulation and frequency modulation caused by the turbulance, then received by the microphone 4c. This modulated signal $S_{OUT}$ is eliminated of higher harmonics component by a wave shaping circuit 6 including a low pass filter and others and only the modulated frequency as an envelope component is selected, thus detecting the alternate voltage signal $E\omega$ (FIGS. 2-a and 3) having a frequency proportional to the air flow rate, that is the air volume rate, and fluctuating periodically.

This alternate voltage signal $E\omega$ is converted into a succession of pulses $P\omega$ (FIGS. 2-b and 4-a) synchronized with its frequency by a pulse generating circuit 7a of a micro-computer 7 employed as an electric control means, then converted into a succession of driving pulses $P\omega/4$ synchronizing with the demultiplied frequency equal to a quater of the frequency of $P\omega$ by a demultiplying circuit 7b constituted of a flip-flop and others (FIG. 4-b).

The driving pulses $P\omega/4$ is split into three succession of driving pulses $P(\omega/4)_0$, $P(\omega/4)_\phi$ and $P(\omega/4)_{2\phi}$ (FIGS. 4-c and 4-d) having phases shifted for one third of a period with one another by a phase conpensating circuit 7c, then outputted from the terminals F, G and H of the micro-computer 7.

The suffix $\omega$ designates an angular velocity corresponding to the frequency proportional to the air flow velocity. The sign $\phi$ indicates that the driving pulses $P(\omega/4)_\phi$ are shifted for ⅓ of its period relative to the driving pulses $P(\omega/4)_0$, and $2\phi$ indicates that the driving pulses $P(\omega/4)_{2\phi}$ are shifted for ⅔ of its period relative to the driving pulses $P(\omega/4)_0$.

The driving pulses $P(\omega/4)_0$, $P(\omega/4)_\phi$ and $P(\omega/4)_{2\phi}$ are continuously applied to the solenoids 8a of a first, second and third electromagnetic valves 8, respectively.

Each electromagnetic valve 8 is operated in synchronism with the driving pulses $P(\omega/4)_0$, $P(\omega/4)_\phi$ or $P(\omega/4)_{2\phi}$. The pulse width $\tau$ of the driving pulses is selectively determined according to the specific performance of the electromagnetic valve 8.

The electromagnetic valves 8, 8 and 8 are disposed in the manner that the fuel outlet of each electromagnetic valve 8 is opened into a junction 9a of a suction manifold 9 in the down stream of the throttle valve 2. Each electromagnetic valve 8 includes a valve case 8b, a solenoid 8a, and a plunger 8c connected to the valve case 8b by a spring 8e urging the plunger 8c in the direction that a needle valve 8d which is formed in one body with the plunger 8c closes the fuel outlet 8f.

The driving pulses $P(\omega/4)_0$, $P(\omega/4)_\phi$ and $P(\omega/4)_{2\phi}$ are applied to the corresponding solenoid 8a of the respective electromagnetic valve 8 by the micro-computer 7, then the driven solenoid 8a forces the plunger 8c to shift for a fixed distance against the spring 8e and the needle valve 8d opens the fuel outlet 8f. While the pulse input is not applied, the spring 8e depresses the plunger 8c to keep the fuel outlet 8f closed by the needle valve 8d.

The electromagnetic valves 8, 8 and 8 are illustrated in separate disposition in FIG. 1, however, in practice, they are disposed so that the fuel outlets are centralized at the junction 9a of the suction manifold 9 as illustrated in FIGS. 5 and 6.

A fuel regulator 10 has a first chamber 10b and a second chamber 10c partitioned by a diaphragm 10a. The first chamber 10b is connected to the three electromagnetic valves 8 with a fuel feed pipe 11 while the second chamber 10c is connected to an opening on the suction pipe 9 near the fuel outlet 8f with a vacuum tube 12.

The first chamber 10b is connected to a fuel tank 13 with a fuel feed pipe 14 having an electric fuel pump P in the line and with a fuel return tube 15.

A valve 10d, for controlling the fuel return rate by regulating the opening of the return tube 15 in the first chamber 10b, is fixed to the diaphragm 10a in the first chamber 10b. A spring 10f, provided in the second chamber 10c between the spring seat 10e formed on the diaphragm 10a and the body of the fuel regulator 10, pushes the valve 10d through the spring seat 10e and the diaphragm 10a in the direction that the valve 10d closes the opening end of the return tube 15.

When the pressure in the suction pipe 9 decreases, the pressure in the second chamber 10c also decreases so that the diaphragm 10a is pulled against the spring 10f opening the valve 10d to allow a part of the fuel to return into the fuel tank 13 through the fuel return tube 15, then the fuel pressure feeding the fuel to the electromagnetic valve 8 is reduced, thus maintaining the fixed pressure differential between the fuel feed pressure to the electromagnetic valve 8 and the suction pressure near the fuel outlet.

An operating condition detector is provided to detect the temperature of the engine cooling water, the load condition, the acceleration and deceleration rate and the engine operating condition and to produce electric signals corresponding to those conditions.

The operating condition detector includes a sensor 16a for detecting the engine cooling water temperature, a sensor 16b for detecting the load level, a sensor 16c for detecting the acceleration and deceleration rate and a sensor 16d for detecting the oxygen concentration of the exhaust gas. A control circuit 16 receives and synthesizes the information signals from the sensors 16a to 16d to judge the operating condition and produces electric signals by a previously programmed calculating means.

The control circuit 16 is included in the micro-computer 7.

The input signals from the sensors 16a to 16d is inputted to the control circuit 16 through terminals A, B, C and D, then transmitted to the main control circuit of the micro-computer 7.

The main control circuit modulates the predetermined pulse width $\tau$ of the driving pulses $P(\omega/4)_0$, $P(\omega/4)_\phi$ and $P(\omega/2)_{2\phi}$ applied to the electromagnetic valves 8 corresponding to the electric signals given by the control circuit 16 of the operating condition detector.

The driving pulses $P(\omega/4)_0$, $P(\omega/4)_{100}$ and $P(\omega/4)_{2\phi}$ of modulated pulse width is outputted from the terminals F, G and H of the micro-computer 7 and applied to the respective electromagnetic valves 8.

In FIG. 1, reference numerals 17 and 18 designate an engine of a motor vehicle and an exhaust pipe, respectively.

A fuel feed device according to the present invention thus constituted converts the flow rate or the volume flow rate of the intake air sucked through the air cleaner 1 into an alternate voltage signal $E\omega$ (FIG. 2-a) of a frequency proportional to the air flow rate by the air flow rate detecting device 4, then the alternate voltage signal $E\omega$ is converted into a pulse signal $P\omega$ (FIGS. 2-b and 4-a).

The pulses $P\omega$ is converted into driving pulses $P(\omega/4)$ with a quarter of the frequency of the pulses $P\omega$ produced by demultiplying the pulses $P\omega$. The driving pulses $P(\omega/4)$ is then split into three succession of pulses $P(\omega/4)_0$, $P(\omega/4)_\phi$ and $P(\omega/4)_{2\phi}$ shifted for one third of a frequency with each other, then applied to the first to third electromagnetic valves 8, 8 and 8 so that each electromagnetic valve 8 is operated in synchronism with the corresponding driving pulses, thus feeding the fuel to the junction 9a of the suction manifold 9 in regular order, therefore, the electromagnetic valves 8 operate at a demultiplied lower frequency of a quarter of the frequency of the $P\omega$ proportional to the frequency of the of the engine rotation in the engine operation at the maximum engine speed, accordingly, the electromagnetic valves 8 perform stabilized operation even at the maximum engine speed as the load on the electromagnetic valve 8 is reduced.

The fuel pressure to the electromagnetic valves 8, that is the fuel pressure in the first chamber 10b of the fuel pressure regulator 10, is controlled in the following manner.

The differential force between a pulling force produced by the vacuum in the suction manifold and the spring force of the spring 10f acting on the diaphragm opens or closes the valve 10d when the fuel pressure in the first chamber 10b is over or under the differential force, respectively, thus maintaining the fuel pressure in the first chamber 10b approximately at the level of the differential force. The fuel of a controlled pressure is fed to the electromagnetic valves 8 and the fuel having a fixed pressure differential ralative to the suction manifold pressure is injected into the suction pipe 9.

In this state, when a signal is sent from a sensor 16a, 16b, 16c or 16d, corresponding to the change in the engine operating condition, to the control circuit 16, the control circuit 16 sends an output signal corresponding to the input signal to the main control circuit of the micro-computer 7 where the pulse width $\tau$ of the driving pulses $P(\omega/4)_0$, $P(\omega/4)_\phi$ and $P(\omega/4)_{2\phi}$ applied to the electromagnetic valves 8 is modulated in accordance with the electric signal given by the control circuit 16, then the driving pulses are sent from the terminals F, G and H to the respective electromagnetic valves 8 to drive the electromagnetic valves 8.

The duration of opening of the electromagnetic valves 8 being controlled in proportion to the width of the pulses, the fuel injection rate varies corresponding to the operating condition of the engine so that the fuel injection rate is electronically controlled to maintain optimum condition corresponding to the operating condition of the engine.

The fuel feed device according to the present invention injects into the suction pipe 9 the fuel having a fixed pressure differential relative to the manifold vacuum of the suction manifold through a plurality of (e.g. three) electromagnetic valves 8 controlled to operate in synchronism with or following a frequency generated by demultiplying into a quarter of a frequency of an alternate voltage signal $E\omega$ proportional to the quantity of the suction air, furthermore, the three electromagnetic valves 8 are driven in regular order with the driving timing shifted for one third of a period of the demultiplied frequency, therefore, the device is capable of highly accurate and reliable electronic control of the fuel feed over the wide range of engine operating condition from the idling to the maximum speed operation.

It is to be understood that the number of electromagnetic valves 8 and the demultiplying ratio is optional depending on the type of the engine.

Although the electromagnetic valves 8 are disposed in the down stream of the throttle valve 2 in the preferred embodiment as described hereinbefore, in modifications, the electromagnetic valves 8 may be disposed in the upper stream of the throttle valve 2.

Instead of the air flow rate detecting device 4 of the preferred embodiment as described above constituted of a speaker 4b and a microphone 4c, the air flow rate detecting device 4 may be constituted to detect the frequency of the Karman trail by detecting the resistance variation of thermister sensors.

In this constitution, a pair of thermister sensors are buried symmetrically in the front face of the prism 4a and connected to form two sides of a bridge circuit and a very small current is introduced to the circuit from a constant current power source. Alternate eddies produced by the flow of air cause the resistance of the pair of thermister sensors to change alternately in a frequency equal to that of the alternate eddy production, consequently, an electric signal of a frequency proportional to the air flow rate is obtained as the bridge circuit generates one cycle of alternate voltage signal at generation of a pair of eddies.

The wave form shaping circuit 6 may be provided integrally in the micro-computer 7 or separately.

In the preferred embodiment as described hereinbefore, the opening duration of the electromagnetic valves 8 is adjusted by controlling the pulse width corresponding to the operating condition of the engine, however, the fuel pressure for the electromagnetic valves 8 may be controlled corresponding to the operating condition of the engine.

It may be well understood from what has been described hereinbefore that the fuel feed device for an engine of the present invention has the advantage that the fuel injection is highly reliable over the wide range of the engine operating condition from the idling to the maximum speed operation of the engine as the fuel injection is electronically controlled by operating a plurality of electromagnetic valves shifting the operating timing of the electromagnetic valves with each other so as to be synchronized or to follow the frequency or the demultiplied frequency of an electric signal produced from an air flow rate detecting device.

What is claimed is:

1. A fuel feed device for an engine comprising an air flow rate detecting device for generating an electric signal having a frequency proportional to varying suction air flow rate; a plurality of electromagnetic valves disposed at a junction of a suction manifold for controlling the fuel feed rate to said suction manifold; a fuel pressure regulator for maintaining a fixed pressure differential between the fuel feed pressure to said electromagnetic valves and the suction pressure near a fuel outlet; and an electric control means for driving said electromagnetic valves with a shifted phase with one another in synchronism with a frequency of the electric signal generated from said air flow rate detecting device.

2. A fuel feed device for an engine according to claim 1, wherein said electric control means is constituted to drive said electromagnetic valves with a shifted phase with one another in synchronism with a frequency produced by demultiplying the frequency of the electric signal generated by said air flow rate detecting device.

3. A fuel feed device for an engine according to claim 1, wherein said electric control means is constituted to drive said electromagnetic valves with a shifted phase of a reciprocal of the number of said electromagnetic valves with one another in synchronism with a frequency of the electric signal generated by said air flow rate detecting device.

4. A fuel feed device for an engine according to claim 2, wherein said electric control means is constituted to drive said electromagnetic valves with a shifted phase of a reciprocal of the number of said electromagnetic valves with one another in synchronism with a frequency produced by demultiplying the frequency of the electric signal generated by said air flow rate detecting device.

5. A fuel feed device for an engine according to claim 4, wherein said electric control means comprises a means for generating a successional pulse signals synchronized with a frequency of the electric signal generated by said air flow rate detecting device; a means for demultiplying said successional pulse signals; and a means for generating demultiplied successional pulse signals of a number equal to the number of said electromagnetic valves in a shifted phase equal to a reciprocal of the number of said electromagnetic valves with one another.

6. A fuel feed device for an engine according to claim 3, wherein a means for modulating the pulse width of said demultiplied successional pulse signals corresponding to the operating condition of the engine is included.

7. A fuel feed device for an engine according to claim 1, wherein said air flow rate detecting device is provided with a prism member disposed approximately perpendicularly against the stream of the suction air and is constituted to detect the air flow rate by measuring the eddy producing frequency generated in the down stream of said prism member.

8. A fuel feed device for an engine according to claim 1, wherein said fuel pressure regulator comprises two chambers partitioned by a diaphragm, one of which being connected to a fuel pump and said electromagnetic valves through fuel feed tubes and the other of which being connected to an opening in the suction manifold near said fuel outlet; a fuel return tube to return the fuel flowing through one of said chambers to the upper stream of said fuel pump; a control valve provided for said return tube and driven by said diaphragm; and a spring urging said diaphragm in the direction to close said control valve.

9. A fuel feed device for an engine characterized in the provision of an air flow rate detecting device for generating an electric signal of a frequency proportional to varying suction air flow rate; a plurality of electromagnetic valves disposed at a junction of a suction manifold to control the fuel feed rate to said suction manifold; a fuel pressure regulator for maintaining a fixed pressure differential between the fuel feed pressure to said electromagnetic valves and the suction pressure near a fuel outlet; and an electric control means for driving said electromagnetic valves with a shifted phase with one another to follow a frequency of the electric signal generated by said air flow rate detecting device.

10. A fuel feed device for an engine according to claim 9, wherein said electric control means is constituted to drive said electromagnetic valves with a shifted phase with one another to follow a frequency produced by demultiplying the frequency of the electric signal generated by said air flow rate detecting device.

* * * * *